(12) United States Patent
Deng et al.

(10) Patent No.: US 11,097,445 B2
(45) Date of Patent: Aug. 24, 2021

(54) DESCENDING TYPE CERAMIC 3D PRINTER

(71) Applicant: DONGGUAN UNIVERSITY OF TECHNOLOGY, Dongguan (CN)

(72) Inventors: Jun Deng, Dongguan (CN); Jun Tian, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 223 days.

(21) Appl. No.: 16/285,144

(22) Filed: Feb. 25, 2019

(65) Prior Publication Data
US 2019/0375129 A1 Dec. 12, 2019

(30) Foreign Application Priority Data
Jun. 12, 2018 (CN) .......................... 201810598284.7

(51) Int. Cl.
*B28B 1/00* (2006.01)
*B28B 13/02* (2006.01)
(Continued)

(52) U.S. Cl.
CPC .......... *B28B 1/001* (2013.01); *B28B 13/0295* (2013.01); *B28C 5/1223* (2013.01); *B28C 5/16* (2013.01); *B29C 64/00* (2017.08); *B29C 64/124* (2017.08); *B29C 64/135* (2017.08); *B29C 64/153* (2017.08); *B29C 64/20* (2017.08); *B29C 64/214* (2017.08); *B29C 64/245* (2017.08);
(Continued)

(58) Field of Classification Search
CPC ... B28B 13/0295; B28B 1/001; B28C 5/1223; B28C 5/16; B29C 64/245; B29C 64/00; B29C 64/153; B29C 64/20; B29C 64/214; B29C 64/343; B29C 64/35; B29C 64/321; B29C 64/329; B29C 64/124; B29C 64/135
USPC .................................................. 425/110, 375
See application file for complete search history.

(56) References Cited

U.S. PATENT DOCUMENTS

2016/0288265 A1* 10/2016 Suzuki ................. B23K 26/342
2018/0369917 A1* 12/2018 Mottin ...................... B22F 5/04

* cited by examiner

*Primary Examiner* — Joseph S Del Sole
*Assistant Examiner* — Lawrence D. Hohenbrink, Jr.
(74) *Attorney, Agent, or Firm* — Law Offices of Steven W. Weinrieb

(57) ABSTRACT

The present invention relates to a descending type ceramic 3D printer comprising a rack, the middle part of the rack is provided with a charging block sealed with the four sides thereof, the lower part of the charging block is connected with a lifting device for printing, the lifting device for printing is mounted on the lifting mounting block arranged at the lower part of the rack, the upper left side of the rack is provided with a scraping device cooperating with the material in the charging block, the upper right side thereof is provided with a mounting rack, the mounting rack is provided with a light spot emission device and a light transmission block that cooperate with each other, and the mounting rack is further provided with a discharging device; the present invention aims to provide a descending type ceramic 3D printer in which the light transmission block and the light spot emission device are arranged above the charging block so that the charging block are descended gradually to realize the printing of the product, and when printing and feeding of each part finishes, the scraping device will scratch it flat, greatly guarantying the flatness of each printing, and ensuring the performance of the joint portions, thereby improving the quality of the product.

9 Claims, 4 Drawing Sheets

(51) Int. Cl.
*B28C 5/12* (2006.01)
*B28C 5/16* (2006.01)
*B29C 64/245* (2017.01)
*B33Y 30/00* (2015.01)
*B29C 64/124* (2017.01)
*B29C 64/214* (2017.01)
*B29C 64/153* (2017.01)
*B29C 64/00* (2017.01)
*B29C 64/321* (2017.01)
*B29C 64/329* (2017.01)
*B29C 64/35* (2017.01)
*B29C 64/20* (2017.01)
*B29C 64/343* (2017.01)
*B29C 64/135* (2017.01)

(52) U.S. Cl.
CPC .......... *B29C 64/321* (2017.08); *B29C 64/329* (2017.08); *B29C 64/343* (2017.08); *B29C 64/35* (2017.08); *B33Y 30/00* (2014.12)

DESCENDING TYPE CERAMIC 3D PRINTER

FIELD OF THE INVENTION

The present invention relates to the field of printing devices, and more particularly to a descending type ceramic 3D printer.

BACKGROUND OF THE INVENTION

With the development of the technology, the 3D printing devices become more and more common, among which the ceramic 3D printers can print relatively smoother products by using light spot solidification forming and are widely used. The existing ceramic 3D printers are mostly provided with a charging box, the bottom of the charging box is provided with a light transmission block, the lower part thereof is cooperated with a light spot emitter and the upper part thereof is provided with a forming lifting block. The printed portion of the product is ascended by the forming lifting block then the lower part is printed, and this way is the ascending type printing which has some defects, that is, there may be burrs each time when the lower part of the printed portion and the upper part of the reprinted portion are combined, thereby resulting in the performance of the joint portion of the product is not very good, affecting the quality of the printed product.

SUMMARY OF THE INVENTION

The present invention aims to provide a descending type ceramic 3D printer in which the light transmission block and the light spot emission device are arranged above the charging block so that the charging block are descended gradually to realize the printing of the product, and when each part is finished printing and feeding, the scraping device will scratch it flat, greatly guarantying the flatness of each printing, and ensuring the performance of the joint portions, thereby improving the quality of the product.

In order to achieve the objective above, the technical solution adopted in the present invention is as follows:

A descending type ceramic 3D printer comprises a rack, the middle part of the rack is provided with a charging block sealed with the four sides thereof, the lower part of the charging block is connected with a lifting device for printing, the lifting device for printing is mounted on the lifting mounting block arranged at the lower part of the rack, the upper left side of the rack is provided with a scraping device cooperated with the material in the charging block, the upper right side thereof is provided with a mounting rack, the mounting rack is provided with a light spot emission device and a light transmission block that cooperate with each other, and the mounting rack is further provided with a discharging device.

Further, the middle part of the charging block is provided with a forming port, the forming port is provided with a forming mesh plate and a forming sealing block from top to bottom, the forming mesh plate is provided with a discharging hole, the lower part of the forming sealing block is provided with an L-shaped forming sealing mounting block, and the horizontal part of the forming sealing mounting block is locked at the lower part of the charging block through a forming sealing mounting bolt.

Further, the lower center of the forming sealing block is provided with a lifting and locating rod for printing, the lower part of the lifting and locating rod for printing is cooperated with a lifting and locating block for printing in a contacting not connecting way, the lower left and right sides of the lifting and locating block for printing are connected with a lifting and locating cylinder for printing, and the lifting and locating cylinder for printing is mounted on the lifting mounting block.

Further, the position where the lifting mounting block is located between two lifting and locating cylinders for printing is evenly provided with the lifting limit cylinders for printing, the upper part of the lifting limit cylinder for printing is connected with a lifting limit block for printing, and all the lifting limit blocks for printing form a stair-step shape of the same height difference.

Further, the scraping device comprises a scraping and lifting cylinder embedded in the rack and the position thereof passing through the rack is provided with a scraping cylinder, the scraping cylinder is connected with a scraping block matched with the charging block, and the position where the upper part of the rack is located at the front and rear side of the charging block is provided with a scraping block.

Further, the position where the rack is located between the scraping and lifting cylinder and the charging block is embedded with a remainder collecting box, a cleaning tank of the scraping block is arranged in the right side wall of the remainder collecting box, a cleaning spring of the scraping block is arranged in the cleaning tank of scraping block, and the cleaning spring of the scraping block is provided with a cleaning cone block of the scraping block cooperated with the lower side of the scraping block.

Further, a collecting box outlet is arranged in the side wall of the remainder collecting box, communicating with the cleaning tank of the scraping block and having a front and rear width smaller than the cleaning tank of the scraping block, and the lower part of the cleaning spring of the scraping block is provided with a mounting block of the cleaning spring cooperated with the cleaning tank of scraping block in a non-fixedly connecting way.

Further, the position where the mounting rack is located at the upper and lower part of the light transmission block is provided with a light transmission adjusting cylinder, the light transmission adjusting cylinder is connected with a light transmission adjusting block cooperated with the light transmission block, the upper light transmission adjusting block is provided with a light shading block on the left side, and the lower light transmission adjusting block is provided with a light shading block on the right side.

Further, the discharging device comprises a discharge barrel fixedly connected to the lower part of the mounting rack, the lower part of the discharging barrel is provided with a discharging port, the discharging port is cooperated with a discharging tube, the side of the discharging barrel is communicated with a feeding tube and the inner bottom surface thereof is provided with an opening and closing swivel block for discharging, and the opening and closing swivel block for discharging is provided with an opening and closing port for discharging cooperated with the discharging port, the opening and closing swivel block for discharging is fixedly connected with an opening and closing swivel shaft for discharging which is vertically oriented and passes through the upper part of the discharging barrel and the position where the opening and closing swivel shaft for discharging is located in the discharging barrel is provided with an agitating rod for discharging, and the opening and closing swivel shaft for discharging is cooperated with a rotating motor for discharging arranged on the mounting rack.

The advantageous effects of the present invention are as follows:

The light transmission block and the light spot emission device and are arranged above the charging block so that the charging block are descended gradually to realize the printing of the product, and when each part is finished printing and feeding, the scraping device will scratch it flat, greatly guarantying the flatness of each printing, and ensuring the performance of the joint portions, thereby improving the quality of the product.

The designs of the forming mesh plate and the forming sealing block ensure the sealing performance in the process of forming and the accuracy of the printing and forming while facilitating the discharging of the printed products through the discharging hole.

The cooperation design of the lifting and locating block for printing and the lifting and locating rod for printing can realize the secondary locating of the lifting of the charging block, thereby better ensuring the lifting accuracy of the charging block.

The design of the stair-step shape of the lifting limit block for printing can precisely control the precision of each descending of the charging block, greatly improving the printing precision.

The structural design of the scraping device adopts integrative scraping to ensure the overall flatness after scraping, and at the same time, it can scrape and grind the printed parts to ensure the accuracy of subsequent printing.

The designs of the remainder collecting box and the cleaning part of the scraping block can recycle the excess ceramic mucus and clean the bottom of the scraping block to ensure the flatness of each scraping.

The designs of the mounting block of the cleaning spring and collecting box outlet enable that the cleaning portion of the scraping block can be removed as a whole and the remainder collecting box also can be removed and replaced.

The designs of light transmission adjusting block and the light shading block can adjust the range of the light transmission thereby better controlling the printing range.

The design of the discharging device can agitate the material in the discharging barrel when the discharging is started, thereby avoiding the solidification of the material in the discharging barrel.

DETAILED DESCRIPTION OF THE ILLUSTRATED EMBODIMENTS

The text markup shown in the Figures are indicated as follows:
1—rack;
2—lifting mounting block;
3—lifting device for printing;
4—charging block;
5—mounting rack;
6—light spot emission device;
7—light transmission block;
8—discharging device;
9—scraping device;
11—forming mesh plate;
12—discharging hole;
13—forming sealing block;
14—forming sealing mounting block;
15—forming sealing mounting bolt;
16—lifting and locating rod for printing;
17—lifting and locating block for printing;
18—lifting and locating cylinder for printing;
19—lifting limit cylinders for printing;
20—lifting limit block for printing;
21—scraping baffle;
22—scraping and lifting cylinder;
23—scraping cylinder;
24—scraping block;
25—remainder collecting box;
26—cleaning tank of the scraping block;
27—cleaning spring of the scraping block;
28—mounting block of the cleaning spring;
29—cleaning cone block of the scraping block;
30—collecting box outlet;
33—light transmission adjusting cylinder;
34—light transmission adjusting block;
35—light shading block;
41—rotating motor for discharging;
43—discharging bucket;
44—discharging port;
45—discharging tube;
46—feeding tube;
47—opening and closing swivel shaft for discharging;
48—agitating rod for discharging;
49—opening and closing swivel block for discharging; and
50—opening and closing port for discharging.

In order to make the technicians in the art better understand the technical solutions of the present invention, the following is a detailed description of the present invention combined with the accompanying drawings. The description in this part is only for demonstration and explanation, and should not limit the scope of protection of the present invention.

Figure 1:
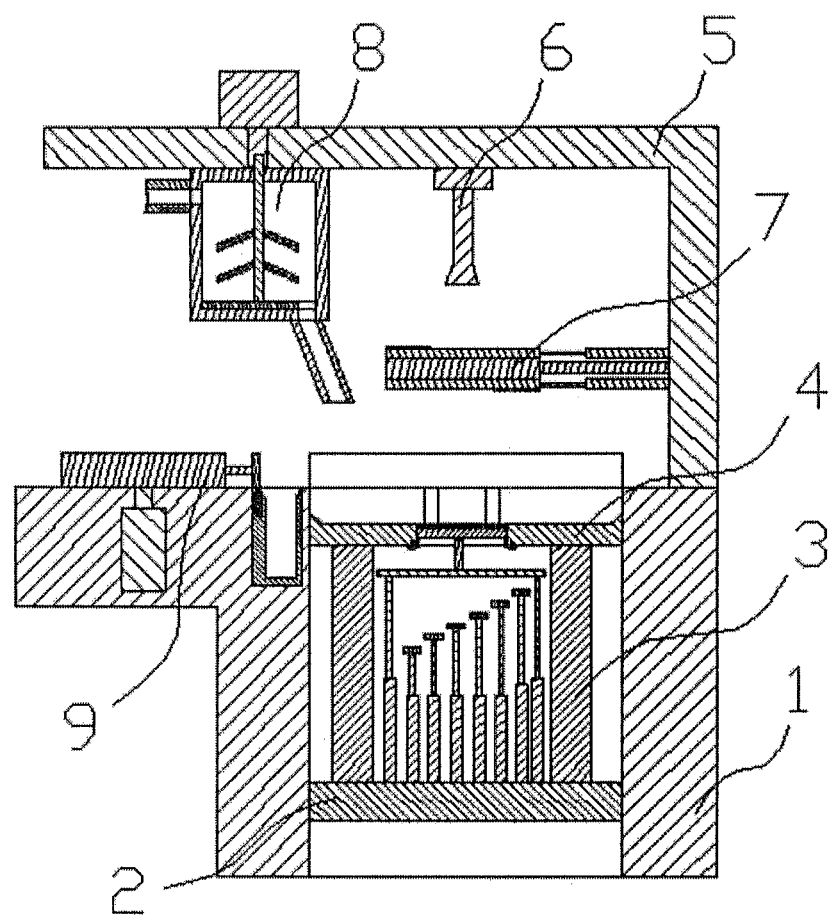
FIG. 1 is the structural schematic view of the descending type ceramic 3D printer.
Figure 2:
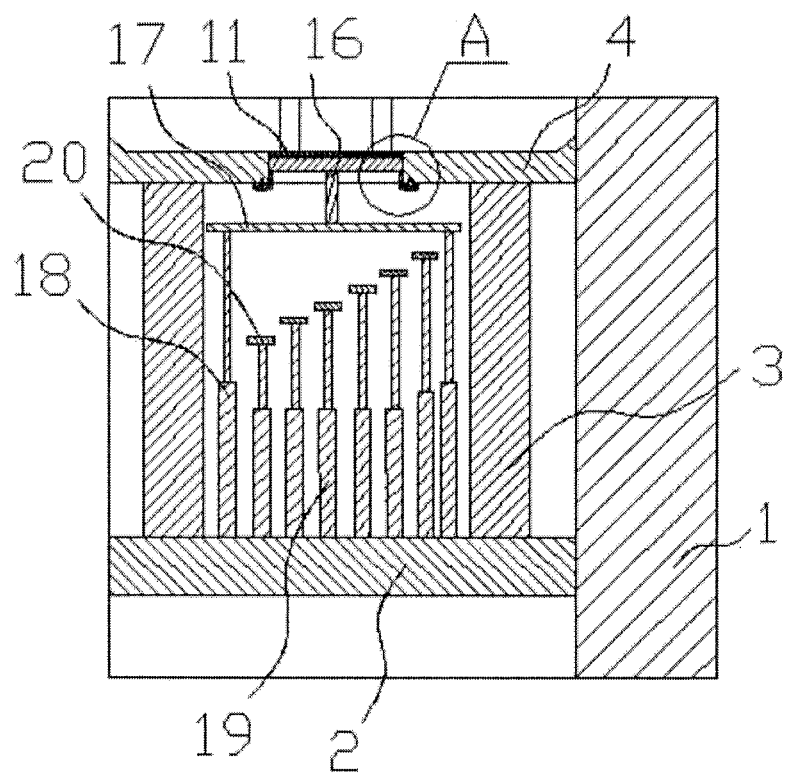
FIG. 2 is the structural schematic view of the lifting part for printing.
Figure 3:
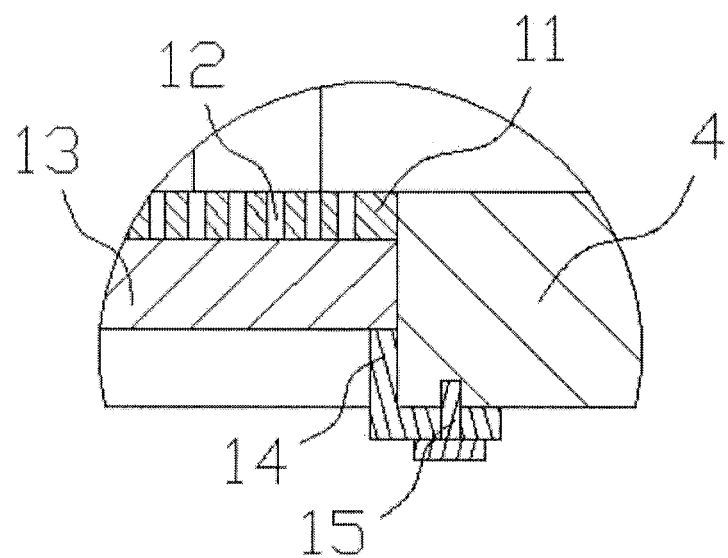
FIG. 3 is the partially enlarged view of the A in FIG. 2.
Figure 4:
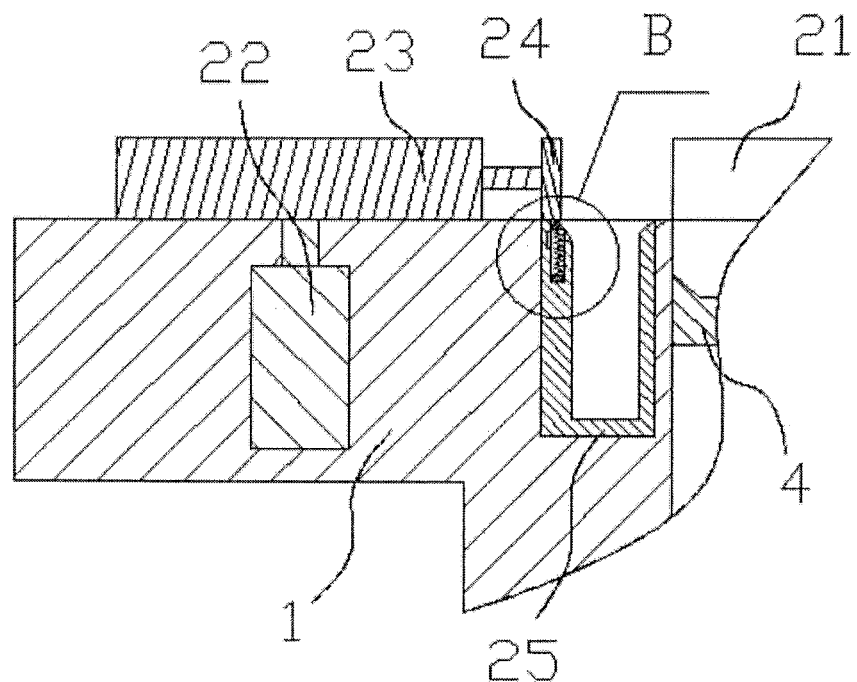
FIG. 4 is the structural schematic view of the scraping device.
Figure 5:
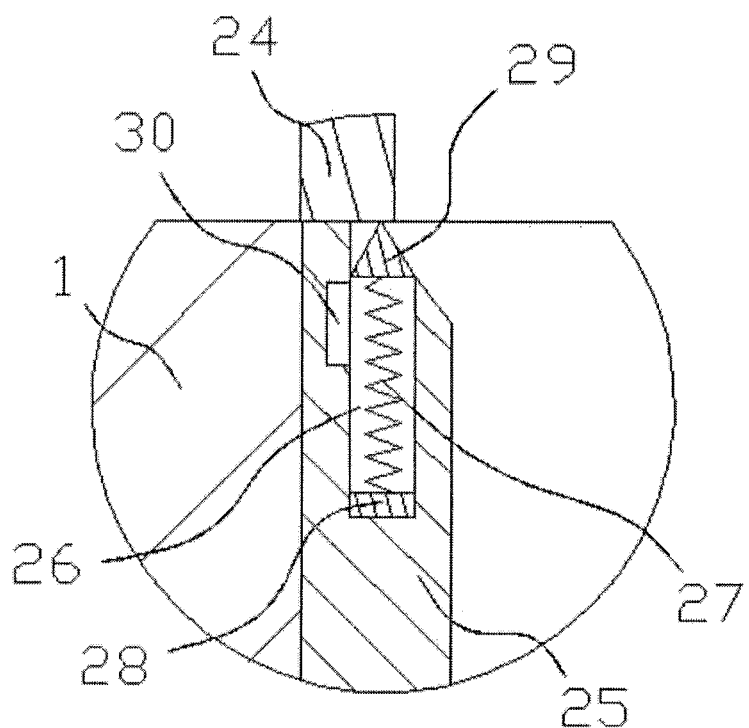
FIG. 5 is the partially enlarged view of B in the FIG. 4.
Figure 6:
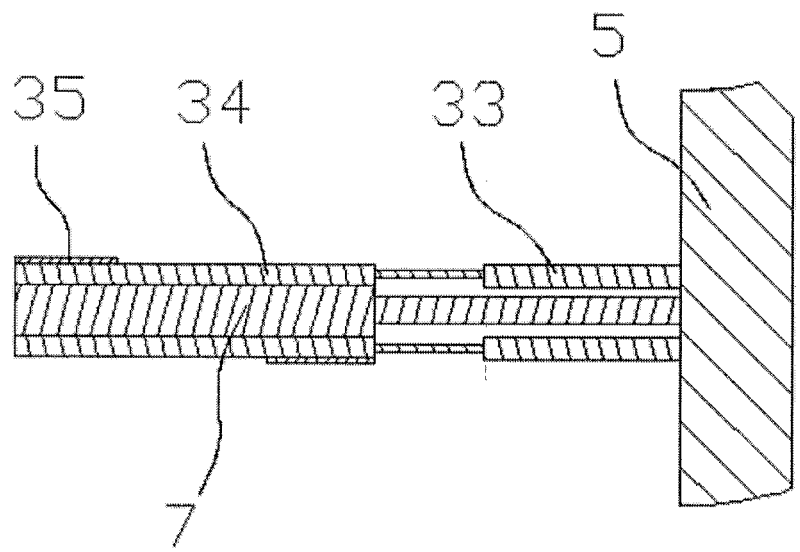
FIG. 6 is the structural schematic view of the light transmission part.
Figure 7:
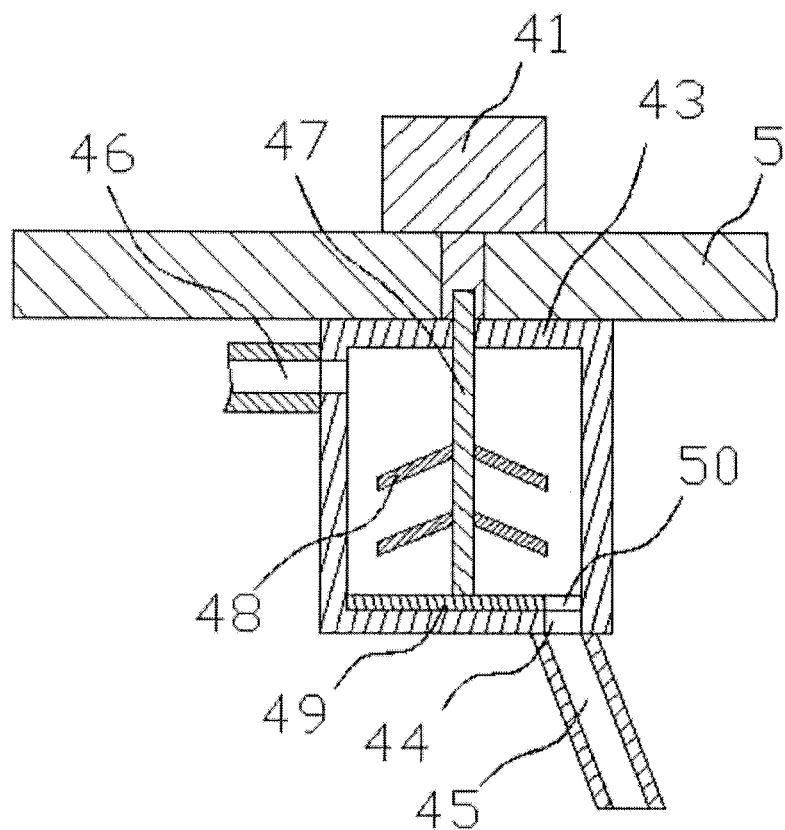
FIG. 7 is the structural schematic view of the discharging device.

As shown in the FIGS. 1-7, the specific structure of the present invention is as follows:

A descending type ceramic 3D printer comprises a rack (1), in which the middle part of the rack is provided with a charging block (4) sealed with the four sides thereof, the lower part of the charging block (4) is connected with a lifting device for printing (3), the lifting device for printing (3) is mounted on the lifting mounting block (2) arranged at the lower part of the rack (1), the upper left side of the rack (1) is provided with a scraping device (9) cooperated with the material in the charging block (4), the upper right side thereof is provided with a mounting rack (5), the mounting rack (5) is provided with a light spot emission device (6) and a light transmission block (7) that cooperate with each other, and the mounting rack (5) is further provided with a discharging device (8).

Preferentially, the middle part of the charging block (4) is provided with a forming port, the forming port is provided with a forming mesh plate (11) and a forming sealing block (13) from top to bottom, the forming mesh plate (11) is provided with a discharging hole (12), the lower part of the forming sealing block (13) is provided with an L-shaped forming sealing mounting block (14), and the horizontal part of the forming sealing mounting block (14) is locked at the lower part of the charging block (4) through a forming sealing mounting bolt (15).

Preferentially, the lower center of the forming sealing block (13) is provided with a lifting and locating rod for printing (16), the lower part of the lifting and locating rod for printing (16) is cooperated with a lifting and locating block for printing (17) in a contacting not connecting way, the lower left and right sides of the lifting and locating block for printing (17) are connected with a lifting and locating cylinder for printing (18), and the lifting and locating cylinder for printing (18) is mounted on the lifting mounting block (2).

Preferentially, the position where the lifting mounting block (2) is located between two lifting and locating cylinders for printing (18) is evenly provided with the lifting limit cylinders for printing (19), the upper part of the lifting limit cylinder for printing (19) is connected with a lifting limit block for printing (20), and all the lifting limit blocks for printing (20) form a stair-step shape of the same height difference.

Preferentially, the scraping device (9) comprises a scraping and lifting cylinder (22) embedded in the rack (1) and the position thereof passing through the rack (1) is provided with a scraping cylinder (23), the scraping cylinder (23) is connected with a scraping block (24) matched with the charging block (4), and the position where the upper part of the rack (1) is located at the front and rear side of the charging block (4) is provided with a scraping block (24).

Preferentially, the position where the rack (1) is located between the scraping and lifting cylinder (22) and the charging block (4) is embedded with a remainder collecting box (25), a cleaning tank of the scraping block (26) is arranged in the right side wall of the remainder collecting box (25), a cleaning spring of the scraping block (27) is arranged in the cleaning tank of scraping block (26), and the cleaning spring of the scraping block (27) is provided with a cleaning cone block of the scraping block (29) cooperated with the lower side of the scraping block (24).

Preferentially, a collecting box outlet (30) is arranged in the side wall of the remainder collecting box (25), communicating with the cleaning tank of the scraping block (26) and having a front and rear width smaller than the cleaning tank of the scraping block (26), and the lower part of the cleaning spring of the scraping block (27) is provided with a mounting block of the cleaning spring (28) cooperated with the cleaning tank of scraping block (26) in a non-fixedly connecting way.

Preferentially, the position where the mounting rack (5) is located at the upper and lower part of the light transmission block (7) is provided with a light transmission adjusting cylinder (33), the light transmission adjusting cylinder (33) is connected with a light transmission adjusting block (34) cooperated with the light transmission block (7), the upper light transmission adjusting block (34) is provided with a light shading block (35) on the left side, and the lower light transmission adjusting block (34) is provided with a light shading block (35) on the right side.

Preferentially, the discharging device (8) comprises a discharge barrel (43) fixedly connected to the lower part of the mounting rack (5), the lower part of the discharging barrel (43) is provided with a discharging port (44), the discharging port (44) is cooperated with a discharging tube (45), the side of the discharging barrel (43) is communicated with a feeding tube (46) and the inner bottom surface thereof is provided with an opening and closing swivel block for discharging (49), and the opening and closing swivel block for discharging (49) is provided with an opening and closing port for discharging (50) cooperated with the discharging port (44), the opening and closing swivel block for discharging (49) is fixedly connected with an opening and closing swivel shaft for discharging (47) which is vertically oriented and passes through the upper part of the discharging barrel (43) and the position where the opening and closing swivel shaft for discharging (47) is located in the discharging barrel (43) is provided with an agitating rod for discharging (48), and the opening and closing swivel shaft for discharging (47) is cooperated with a rotating motor for discharging (41) arranged on the mounting rack (5).

When the descending type ceramic 3D printer is used specifically, the charging block (4) is adjusted to the initial height first and the features of the product are printed as needed, the position of the light shading block (35) is adjusted by the light transmission adjusting cylinder (33) so that the light transmission range is determined, then the height of each lifting limit block for printing (20) is adjusted by the lifting limit cylinders for printing (19), and the opening and closing swivel shaft for discharging (47) is driven by the rotating motor for discharging (41), thereby driving the agitating rod for discharging (48) to agitate the material and meantime driving the opening and closing swivel block for discharging (49) to rotate so that the opening and closing port for discharging (50) is communicated with the discharging port (44) and the material flows into the discharging tube (45) from the discharging port (44), thereby flowing onto the charging block (4), when the material is discharged to a certain amount, the opening and closing swivel block for discharging (49) will be driven by the rotating motor for discharging (41) to rotate again so that the opening and closing port for discharging (50) and the discharging port (44) will be staggered then the material discharging will be stopped, after that, by the action of the scraping and lifting cylinder (22) and the scraping cylinder (23), the scraping block (24) is made located on the right side of the charging block (4), then the scraping block (24) is made to be stick to the upper surface of the rack (1), after then the scraping block (24) is driven by the scraping cylinder (23) to scrape the materials put in flat and the excess material is scraped into the remainder collecting box (25) along the scraping block (24), when passing through the cleaning cone block of the scraping block (29), the attached material will be scraped off by the cleaning cone block of the scraping block (29) and enter the remainder collecting box (25) to complete the scraping operation, after that then the light spots in specific areas are emitted through the light spot emission device (6), so that the materials on the charging block (4) can be locally cured to complete part of the product printing, and the upper surface of the printed part is made flat after the scraping treatment, then the charging block (4) is driven by the lifting device for printing (3) to descend and stops descending until the lifting and locating rod for printing (16) contacts the lifting and locating block for printing (17), yet the lifting and locating block for printing (17) starts to descend until it hits the lifting limit block for printing (20) and the first lifting and locating block for printing (17) descends to the lowest position, after that, continue to repeat the steps of discharging, scraping, light spot solidification printing and the scraping block (24) and the charging block (4) descending until the product is printed, and the materials in the remainder collecting box (25) and the charging block (4) are recycled and the forming sealing block (13) is removed, thereby the product is discharged through the discharging hole (12) through the thimble from bottom to top.

It should be understood that in the present invention the term "comprises", "comprising" or any other variants thereof is intended to encompass a non-exclusive inclusion, such that a process, method, article, or device that comprises a plurality of elements includes not only those elements but also other elements that are not explicitly listed, or elements that are inherent to such a process, method, item, or device.

The principles and embodiments of the present invention have been described herein with reference to specific examples, and the description of the above examples is only to aid in understanding the method of the present invention and its core idea. The above description is only a preferred embodiment of the present invention, and it should be noted that due to the finiteness of the textual expression, there is an infinitely specific structure objectively. It will be apparent to those skilled in the art that a number of modifications, modifications, or variations may be made without departing from the principles of the invention, and the technical features described above may be combined in an appropriate manner; These improvements, modifications, or combinations, or the direct application of the inventive concepts and technical solutions to other applications without modification, should all be considered to be within the scope of the present invention.

What is claimed is:

1. A descending type ceramic 3D printer comprising:
   a rack;
   a charging block disposed within a central portion of said rack and sealed upon four sides thereof;
   wherein a lifting mounting block is fixedly mounted upon a lower portion of said rack and has a lifting device for printing mounted thereon and which is also connected to an undersurface portion of said charging block;
   a scraping device is operatively mounted upon an upper left side portion of said rack and is adapted to operatively cooperate with material disposed within said charging block while a mounting rack is fixedly connected to an upper right side portion of said rack and is provided with a light spot emission device and a light transmission block that cooperate with each other; and
   a discharging device is mounted upon said mounting rack for discharging material toward said charging block.

2. The descending type ceramic 3D printer in accordance with the claim 1, wherein:
   a forming port is defined within a central portion of said charging block and comprises a forming mesh plate and a forming sealing block disposed beneath said forming mesh plate, wherein said forming mesh plate is provided with a plurality of discharging holes; and
   an L-shaped forming sealing mounting block is fixedly mounted upon said charging block by a horizontal portion of said L-shaped forming sealing mounting block by at least one forming sealing mounting bolt while a vertical portion of said L-shaped forming sealing mounting block secures said forming sealing block in place upon said charging block.

3. The descending type ceramic 3D printer in accordance with the claim 2, wherein:
   an upper end portion of a lifting and locating rod for printing is fixedly connected to a central portion of said forming sealing block, while a lower end portion of said lifting and locating rod for printing is adapted to engage a lifting and locating block for printing;
   wherein left and right sides of said lifting and locating block for printing are fixedly connected to a pair of lifting and locating cylinders for printing; and
   said lifting and locating cylinders for printing are mounted upon said lifting mounting block.

4. The descending type ceramic 3D printer in accordance with the claim 3, wherein:
   a plurality of lifting limit cylinders for printing are interposed between said pair of lifting and locating cylinders for printing, upper end portions of each one of said plurality of lifting limit cylinders for printing are provided with a lifting limit block for printing, and said plurality of lifting limit blocks for printing, respectively disposed atop said plurality of lifting limit cylinders for printing, form a stair-step array wherein the height difference between successive ones of said plurality of lifting limit cylinders for printing is the same.

5. The descending type ceramic 3D printer in accordance with the claim 1, wherein:
   said scraping device comprises a scraping and lifting cylinder which is embedded within said rack and extends through said rack so as to be operatively connected to a scraping cylinder which has a scraping block mounted upon a forward end portion thereof for movement toward said charging block.

6. The descending type ceramic 3D printer in accordance with the claim 5, wherein:
   a remainder collecting box is embedded within said rack so as to be interposed between said scraping and lifting cylinder and said charging block;
   a cleaning tank is defined within a side wall portion of said remainder collecting box; and
   a cleaning spring is operatively disposed within said cleaning tank and is provided for biasing a cleaning cone block into engagement with a lower surface portion of said scraping block.

7. The descending type ceramic 3D printer in accordance with the claim 6, wherein:
   a collecting box outlet is defined within said remainder collecting box so as to be in communication with said cleaning tank of said remainder collecting box and has a front to rear width dimension which is less than the front to width dimension of said cleaning tank of said remainder collecting box; and
   a lower end portion of said cleaning spring of said cleaning tank is disposed upon a mounting block disposed within a lower end portion of said cleaning tank.

8. The descending type ceramic 3D printer in accordance with the claim 1, wherein:
   said light transmission block comprises a light transmission adjusting cylinder;
   wherein said light transmission adjusting cylinder is operatively connected to a light transmission adjusting block;
   a first light shading block is operatively connected to an upper left side portion of said light transmission adjusting block; and
   a second light shading block is operatively connected to a lower right side portion of said light transmission adjusting block.

9. The descending type ceramic 3D printer in accordance with the claim 1, wherein:
   said discharging device comprises a discharge barrel fixedly connected to a lower surface portion of said mounting rack;
   a lower end portion of said discharging barrel is provided with a discharging port;

a discharging tube is disposed in fluidic communication with said discharging port;

a feeding tube is fluidically connected to an upper side wall portion of said discharging barrel;

an opening and closing rotary discharging block is disposed within a bottom portion of said discharging barrel for discharging material out from said discharging barrel through said first discharging port, said opening and closing rotary discharging block has an opening and closing discharging port defined therein for fluidically cooperating with said discharging port defined within said discharging barrel;

a vertically oriented opening and closing rotary discharging shaft is connected to said opening and closing rotary discharging block and passes through an upper portion of said discharging barrel;

said vertically oriented opening and closing rotary discharging shaft, disposed within said discharging barrel is provided with a plurality of agitating members fixedly mounted thereon; and a rotary drive motor is mounted atop said mounting rack and is operatively connected to said vertically oriented opening and closing rotary discharging shaft for rotating said vertically oriented opening and closing rotary discharging shaft, said plurality of agitating members disposed thereon, and said opening and closing rotary discharging block.

* * * * *